June 2, 1970 F. ZANDVELD 3,515,994
DEVICE FOR REPRODUCING BIVALENT CODE ELEMENTS
REGISTERED IN A MOVING SIGNAL CARRIER
Filed Sept. 27, 1966
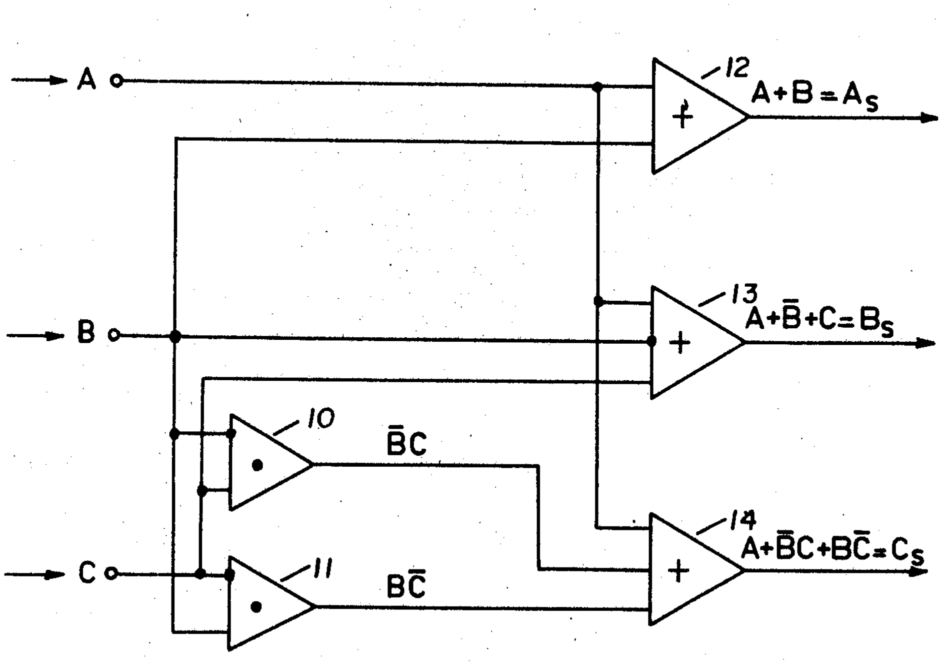
INVENTOR.
FREDERIK ZANDVELD
BY
Frank R. Trifari
AGENT United States Patent Office 3,515,994

Patented June 2, 1970

3,515,994

DEVICE FOR REPRODUCING BIVALENT CODE ELEMENTS REGISTERED IN A MOVING SIGNAL CARRIER

Frederik Zandveld, Beekbergen, Netherlands, assignor, by mesne assignments, to U.S. Philips Corporation, New York, N.Y., a corporation of Delaware Filed Sept. 27, 1966, Ser. No. 582,444
Claims priority, application Netherlands, Sept. 8, 1965, 6512524
Int. Cl. H03k *17/02*
U.S. Cl. 328—92 6 Claims

ABSTRACT OF THE DISCLOSURE

Intraword synchronization in data transmission is effected by converting each information word into a sequence of inversions and permanences wherein no internal sequence in each word of more than two permanences exists, and no word begins or ends with two or more permanences.

This invention relates to devices for reproducing bivalent code elements registered in a moving signal carrier and consisting of inversions of the state of magnetisation of the signal carrier and permanences (non-inversions) of the state of magnetisation of the signal carrier, where the synchronizing signal is derived from the signal to be reproduced. As used herein, an inversion can represent a binary one and a permanence a binary zero. The synchronizing signal above referred to is necessary since otherwise the reproducing circuit could take a number of succeeding permanences, for example, a sequence of five successive permanences or four or six successive permanences, for more or less than the relevant number.

In known machines, the synchronizing signal is derived from a signal registered in an additional, so-called "synchronisation track" of the signal carrier. Since the synchronisation track necessarily lies at some distance from the track to be read, the accuracy of, more particularly the phase of, the synchronizing signal is limited by the mechanical back lash and the elastic (and possibly plastic) deformation of the equipment employed, the signal carrier included. In disc and drum stores it is especially the back lash and the elastic deformation of the mechanism for displacing the reading head which play a role. In a tape store it is especially the elastic (and possibly also plastic) deformation of the tape which is important since this may cause a line which is initially at right angles to the direction of movement of the tape to become inclined to this direction.

It will be evident that the above-mentioned amounts of back lash and deformations set a limit to the registration density on the signal carrier, but this limit lies considerably below the limit determined by the magnetic and electronic properties of the equipment employed. This results in the space available for registration on the signal carrier being utilized very incompletely (for approximately 1%).

It has previously been suggested to arrive at a more efficient use of the space available for registration by interlacing the signal to be reproduced with a synchronizing signal. It is possible, for example, to provide that each significant code element to be reproduced (irrespective of whether this in an inversion or a permanence) is followed by an inversion which serves solely for synchronisation. It is thus possible to utilize 50% of the space available for registration. If each two code elements to be reproduced are followed by an inversion serving for synchronisation, even 75% of the space available for registration are used effectively. However, it is impossible to go farther with the actual state of the art since the phase of the synchronizing signal would become too uncertain as three or more succeeding permanences pass along the reading head.

The present invention provides for utilizing the space available for registration with even higher efficiency, not to be regarded as the mere interlacing of the signal to be reproduced with a synchronizing signal. The information to be reproduced is coded in such manner that the signal carrier never has a sequence of three or more permanences. If the code employed is systematic, that is to say if all code groups have the same number of code elements, the above-mentioned condition is fulfilled if: (a) no code group begins or ends with two or more permanences; (b) no code group contains a sequence of three or more permanences.

The foregoing will now be explained with reference to a systematic quinary code. If a permanence and an inversion are represented by the signs 0 and 1 respectively, the 32 possible code groups of the quinary code may be represented by:

| | | | | | |
|---|---|---|---|---|---|
| 1 | × | 00000 | 17 | × | 10000 |
| 2 | × | 00001 | 18 | × | 10001 |
| 3 | × | 00010 | 19 | | 10010 |
| 4 | × | 00011 | 20 | | 10011 |
| 5 | × | 00100 | 21 | × | 10100 |
| 6 | × | 00101 | 22 | | 10101 |
| 7 | × | 00110 | 23 | | 10110 |
| 8 | × | 00111 | 24 | | 10111 |
| 9 | × | 01000 | 25 | × | 11000 |
| 10 | | 01001 | 26 | | 11001 |
| 11 | | 01010 | 27 | | 11010 |
| 12 | | 01011 | 28 | | 11011 |
| 13 | × | 01100 | 29 | × | 11100 |
| 14 | | 01101 | 30 | | 11101 |
| 15 | | 01110 | 31 | | 11110 |
| 16 | | 01111 | 32 | × | 11111 |

Of these 32 code groups, those marked with a cross do not satisfy either the condition *a* or the condition *b*, so that the following 17 code groups remain:

| | | | |
|---|---|---|---|
| 1 | 01001 | 10 | 10110 |
| 2 | 01010 | 11 | 10111 |
| 3 | 01011 | 12 | 11001 |
| 4 | 01101 | 13 | 11010 |
| 5 | 01110 | 14 | 11011 |
| 6 | 01111 | 15 | 11101 |
| 7 | 10010 | 16 | 11110 |
| 8 | 10011 | 17 | 11111 |
| 9 | 10101 | | |

Thus the number of usable code groups is approximately half the number of possible code groups so that the code is redundant. However, the redundance is not such that the code is detectable for errors, not even for errors consisting in overlooking a single inversion, the most frequent type of error.

Sixteen of the seventeen significant code groups can be reproduced one—unambiguously on the sixteen possible code groups of a quaternary code, the remaining code group then still being available for some special purpose. This situation is very favourable because of the fact that there is a strong tendency to design computers which operate with code groups of 8 code elements (referred to as "bytes" in U.S.A.). The computer must in this case include a code translator which translates the code groups of the redundant quinary code into the code groups of the non-redundant quaternary code.

However, the said code translator may be of known type, and the correspondence between the significant code groups of the quinary code and the code groups of the quaternary code (all of which are significant) may be chosen so that the translator may be built up from as little material as possible.

The table following hereinafter gives an example of the results obtained if a similar computation is carried out for systematic binary codes up to and inclusive of the nonary code. In this table:

$n$=number of code elements per code group;
$A_n=2^n$=number of possible code groups of $n$-code elements;
$B_n$=number of code groups which disappears due to nonfulfilment of the condition $a$ or $b$;
$C_n$=loss of code groups in percent;
$E_n=2^{n-1}$ number of possible code groups of $n-1$ code elements.

| $n$ | $A_n$ | $B_n$ | $C_n$ | $D_n$ | $E_n$ |
|---|---|---|---|---|---|
| 2 | 4 | 1 | 25% | 3 | 2 |
| 3 | 8 | 3 | 37% | 5 | 4 |
| 4 | 16 | 7 | 44% | 9 | 8 |
| 5 | 32 | 15 | 47% | 17 | 16 |
| 6 | 64 | 33 | 52% | 31 | 32 |
| 7 | 128 | 71 | 55% | 57 | 64 |
| 8 | 256 | 151 | 59% | 105 | 128 |
| 9 | 512 | 319 | 62% | 193 | 256 |

From this table it appears that the application of the invention to a systematic quaternary code ($n=4$) or quinary code ($n=5$) is very advantageous. In either case, the remaining code groups but for one may be reproduced unambiguously on a code having one code element per code group less than the original code, whilst computers operating with code groups of 8 code elements are now being used on a large scale as well as, although to a lesser extent, computers operating with the code groups of 6 code elements.

By way of example, one possible device for effecting the aforementioned reproduction will now be described in connection with a three element word conversion. With a three element code group, the 8 possible groups may be represented:

(1) × 000
(2) × 001
(3) 010
(4) 011
(5) × 100
(6) 101
(7) 110
(8) 111 of these eight groups, those marked with a cross do not satisfy either the condition ($a$) or the condition ($b$) so that there remain 5 permissible code groups. Terming each element position of the non synchronized code as A, B and C, respectively, and each element position of the synchronized code as $A_s$, $B_s$ and $C_s$ respectively, it is necessary to design a translator or reproducing device with the following desired tabular characteristics:

| | A | B | C | $A_s$ | $B_s$ | $C_s$ |
|---|---|---|---|---|---|---|
| 1 | 0 | 0 | 0 | 0 | 1 | 0 |
| 2 | 0 | 0 | 1 | 0 | 1 | 1 |
| 3 | 0 | 1 | 0 | 1 | 0 | 1 |
| 4 | 0 | 1 | 1 | 1 | 1 | 0 |
| 5 | 1 | 0 | 0 | 1 | 1 | 1 |
| 6 | 1 | 0 | 1 | Redundant | | |
| 7 | 1 | 1 | 0 | Redundant | | |
| 8 | 1 | 1 | 1 | Redundant | | |

It is noted that the last three positions of the synchronized code are redundant or irrelevant. Thus they may be all represented by a similar output pattern.

The logic equations for the foregoing arrangement is thus:

$$A_3=A+B \text{ (including redundancy)}$$
$$B_3=A+\overline{B}+C \text{ (including redundancy)}$$
$$C_3=A+B\overline{C}+\overline{B}C \text{ (including redundancy)}$$

wherein a letter represents an inversion and a "not" or converse letter indication represents a permanence.

A mechanization arrangement for effecting the foregoing equations is illustrated in the figure. Gates 10 and 11 are "AND" and logic gates of any well known design, while 12, 13 and 14 are "OR" gates of any similarly well known design. The circle at a gate input represents an inversion of the particular signal appearing at that point. The arrangement employs as many input and output lines as there are bits in a word, the unsynchronized signal appearing, a word at a time, at the input lines, left hand portion of the figure, and the synchronized signal appearing on the output lines at the right hand portion of the figure.

For quaternary or quinary or even higher order word representations, the foregoing principles in deriving synchronization are equally applicable although it will be understood that the logic equations and arrangements will be increasingly complex.

What is claimed is:

1. A method of reproducing information in the form of a series of $n$ element binary coded words with intra-word synchronization, comprising the steps of, providing a sequence of binary coded words each of $n$ element length wherein each word has no more than two sequential permanences, providing discrete information to be coded, said information comprising a plurality of discrete components, each of said components being indicative of a unit of information, and assigning each of said components to a respective one of said binary coded words.

2. A method of reproducing information in the form of a series of $n$ element binary coded words with intra-word synchronization, comprising the steps of, providing a sequence of binary coded words each of $n$ element length wherein each word has no more than two sequential permanences and wherein each word begins or ends with no more than one permanence, providing discrete information to be coded, said information comprising a plurality of discrete components, each of said components being indicative of a unit of information, and assigning each of said components to a respective one of said binary coded words.

3. A method of reproducing a series of $n$ element binary coded words with intra-word synchronization, comprising the steps of, generating a systematic sequence of binary coded words, each word having $n$ bits, eliminating each of said words having a sequence more than two permanences, and advancing each acceptable word to replace each word thus eliminated.

4. A method of reproducing a series of $n$ element binary coded words with intra-word synchronization, comprising the steps of, generating a systematic sequence of binary coded words, each word having $n$ bits, eliminating each of said words, having a sequence of three or more permanences, eliminating each word beginning or ending with two or more permanences, and sequentially advancing each acceptable word to replace each word thus eliminated.

5. A device for reproducing a series of $n$ element binary coded words with intra-word synchronization comprising $n$ input lines, said input lines receiving a non synchronized series of binary coded representations, gating means connected to each of said input lines, said gating means responsive to more than two permanences in said series of binary coded representations to reproduce an internally synchronized series of $n$ bit binary coded words, each of said words having internal element sequences of no more than two permanences, and $n$ output lines connected to said gating means for manifesting said internally synchronized series.

6. A device for reproducing a series of $n$ element binary coded words with intra-word synchronization comprising $n$ input lines, said input lines receiving a non-synchronized series of binary coded representations, gating means connected to each of said input lines, said gating means responsive to more than two permanences in said series of binary coded representations to reproduce an internally synchronized series of $n$ bit binary coded words, each of said words having internal element sequences of no more than two permanences, and no word having a sequence of two or more permanences at the beginning or ending thereof, and $n$ output lines connected to said gating means for manifesting said internally synchronized series.

References Cited

UNITED STATES PATENTS 3,178,590 4/1965 Heilweil et al. ----- 307—289

DONALD D. FORRER, Primary Examiner

B. P. DAVIS, Assistant Examiner

U.S. Cl. X.R.

307—207; 328—159

UNITED STATES PATENT OFFICE
CERTIFICATE OF CORRECTION

Patent No. 3,515,994 Dated June 2, 1970

Inventor(X) FREDERIK ZANDVELD

It is certified that error appears in the above-identified patent and that said Letters Patent are hereby corrected as shown below:

In Column 1, the line "Claims priority, application Netherlands, Sept. 8, 1965,"; should read --Claims priority, application Netherlands, Sept. 28, 1965--;

Signed and sealed this 20th day of October, 1970.

(SEAL)
Attest:

Edward M. Fletcher, Jr.
Attesting Officer

WILLIAM E. SCHUYLER, JR.
Commissioner of Patents